United States Patent
Nierlich et al.

(10) Patent No.: US 8,227,933 B2
(45) Date of Patent: Jul. 24, 2012

(54) POWER DISTRIBUTION ARCHITECTURE FOR DISTRIBUTING POWER TO ELECTROMECHANICAL ACTUATORS OF AN AIRCRAFT

(75) Inventors: Florent Nierlich, Courbevoie (FR); Francois-Noel Leynaert, Montmorency (FR)

(73) Assignee: Messier-Bugatti-Dowty, Villacoublay (FR)

( * ) Notice: Subject to any disclaimer, the term of this patent is extended or adjusted under 35 U.S.C. 154(b) by 281 days.

(21) Appl. No.: 12/645,193

(22) Filed: Dec. 22, 2009

(65) Prior Publication Data

US 2010/0156174 A1    Jun. 24, 2010

(30) Foreign Application Priority Data

Dec. 22, 2008  (FR) ..................................... 08 07336

(51) Int. Cl.
*B60L 1/00* (2006.01)
(52) U.S. Cl. ...................................................... 307/9.1
(58) Field of Classification Search ............... 307/9.1
See application file for complete search history.

(56) References Cited

U.S. PATENT DOCUMENTS

| | | | |
|---|---|---|---|
| 6,404,150 B1 * | 6/2002 | Nehl et al. ...................... | 318/34 |
| 2009/0157234 A1 * | 6/2009 | Breit et al. ........................ | 701/3 |

FOREIGN PATENT DOCUMENTS

| | | |
|---|---|---|
| EP | 1 099 630 A2 | 5/2001 |
| EP | 1 834 874 A1 | 9/2007 |
| EP | 1 852 347 A1 | 11/2007 |
| EP | 1 926 194 A1 | 5/2008 |
| EP | 2 001 104 A2 | 12/2008 |
| WO | 2007/068451 A1 | 6/2007 |

* cited by examiner

Primary Examiner — Robert L. Deberadinis
(74) Attorney, Agent, or Firm — Sughrue Mion, PLLC

(57) ABSTRACT

The invention relates to a power distribution architecture for an aircraft for powering aircraft electromechanical actuators, the architecture comprising at least one power distribution member for distributing power to such and such an electromechanical actuator connected to the architecture, the architecture receiving power from at least one power supply bus of the aircraft. According to the invention, a DC network of voltage that is variable in controlled manner is interposed between the power supply bus of the aircraft and the power distribution members.

4 Claims, 2 Drawing Sheets

POWER DISTRIBUTION ARCHITECTURE FOR DISTRIBUTING POWER TO ELECTROMECHANICAL ACTUATORS OF AN AIRCRAFT

The invention relates to a power distribution architecture for distributing power to electromechanical and electrohydrostatic actuators of an aircraft, and more generally to electrical actuators.

TECHNOLOGICAL BACKGROUND OF THE INVENTION

Document EP 1 834 874 discloses an architecture for distributing power to electromechanical actuators of aircraft, such as actuators for operating landing gear, and associated doors and hooks, and actuators for actuating aerodynamic devices such as flaps or leading-edge slats.

That document recommends using power distribution members for powering actuators that are physically grouped together, of similar criticality, of like power, and that operate in sequence. The power distribution members essentially comprise an inverter associated with a switch member enabling the power as calibrated by the inverter to be sent to the actuator concerned. The power distribution member is powered directly by one of the power networks of the aircraft.

OBJECT OF THE INVENTION

An object of the invention is to improve on that architecture, in particular by improving the safety of maintenance operators called to act on the actuators, and to do so while reducing losses in the inverters.

BRIEF SUMMARY OF THE INVENTION

In order to achieve this object, there is provided a power distribution architecture for powering electromechanical actuators of aircraft, the architecture comprising at least one power distribution member for distributing power to such and such an electromechanical actuator, the architecture receiving the power from at least one electrical power bus of the aircraft. According to the invention, a direct-current (DC) network of voltage that is variable in controlled manner is interposed between the power electrical power supply bus of the aircraft and the power distribution member.

In this way, the power distribution member does not receive power directly from the power supply bus(es) of the aircraft, but from a DC network that can be adjusted to different operating circumstances of the actuators.

In particular, when the aircraft is parked while still powered, then in the event of it being necessary for maintenance personnel to take action, it is possible to reduce the voltage that exists in the DC network to a level below that which would be dangerous for a maintenance operator should there be an accidental short circuit.

Furthermore, if the power distribution member is fitted with an inverter, regulating the voltage of the network enables losses in the inverter to be limited. Also, for each of the actuators, it is possible to adjust the voltage delivered to the inverter so that it is possible to envisage using the same architecture for powering actuators that operate at low voltage and actuators that, on the contrary, require high voltages.

Furthermore, the voltage in the DC network may be adapted to the impedance of the line delivering power to the actuator, thus enabling each actuator to be supplied with a voltage that is sufficient, regardless of the voltage drop in the line.

Finally, the voltage may be adapted to control the power that is delivered to the actuators, or the power that is returned from the actuators and delivered to the power supply bus of the aircraft.

BRIEF DESCRIPTION OF THE FIGURES

The invention can be understood on reading the following description of the figures in the accompanying drawings, in which.

DETAILED DESCRIPTION OF THE INVENTION

Figure 1:
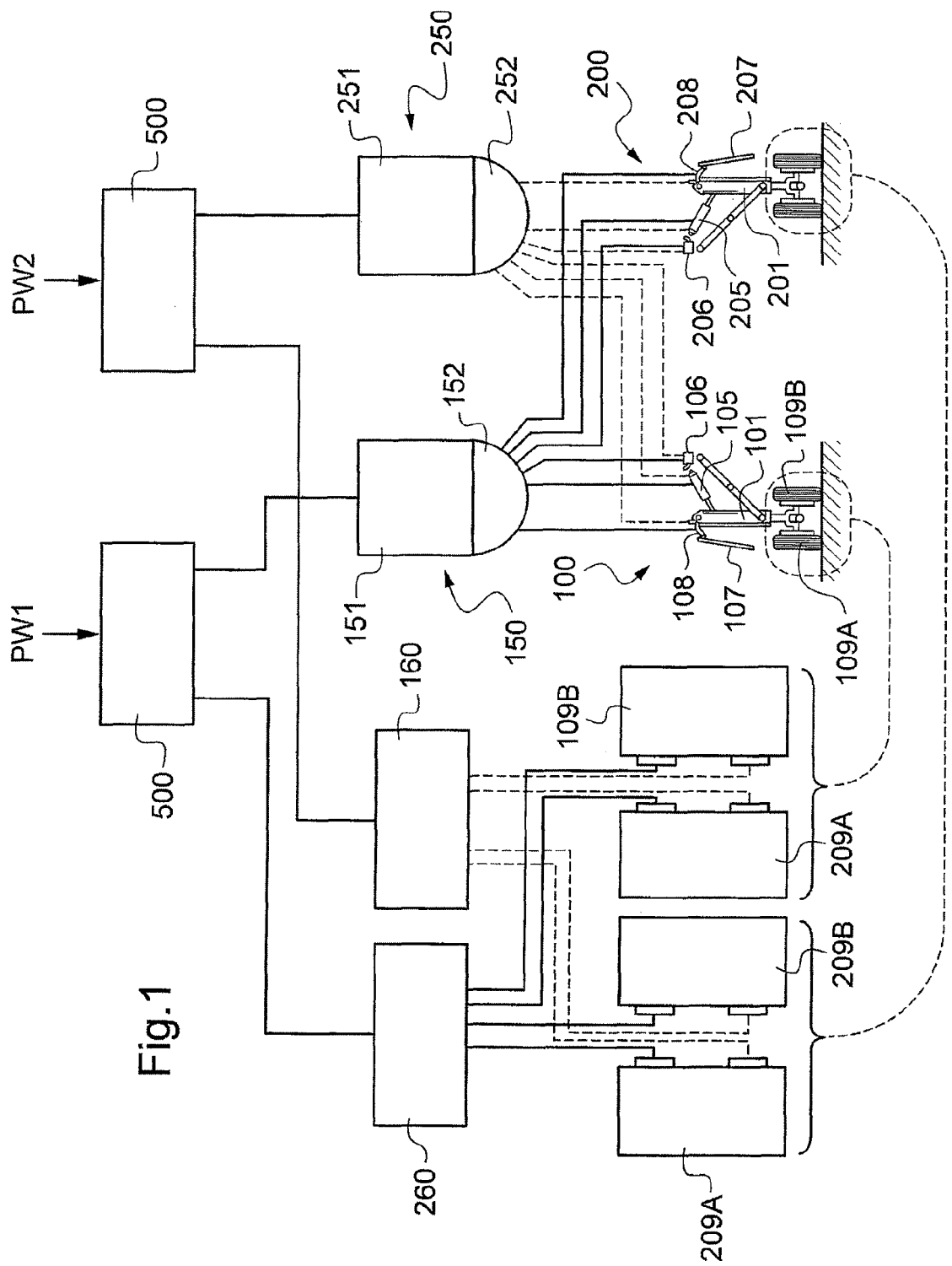
FIG. 1 is a diagrammatic view of a power distribution architecture incorporating a local controllable DC network of the invention.

The architecture described herein is an architecture for distributing power to actuators associated with the landing gear of an aircraft, but that is not limiting in any way.

In this description, reference is made only to the main left and right undercarriages 100 and 200 of the aircraft. These comprise:

- the undercarriages 101, 201 proper, hinged to the structure of the aircraft;
- electromechanical actuators 105, 205 for raising the undercarriages;
- electromechanical hooks 106, 206 for blocking the undercarriages in the stowed position; and
- electromechanical actuators 108, 208 for actuating the doors that close the wells in which the undercarriages are stowed.

Furthermore, in this example, each undercarriage has two wheels 109A & 109B and 209A & 209B each fitted with four electromechanical brake actuators 110A, 110B, 210A, 210B.

In a known configuration, in particular as described in document EP 1 834 874, the electromechanical actuators are powered by power distribution members. Specifically, the actuators associated with the undercarriages 100 and 200 are powered by two power distribution members 150 and 250. These power distribution members comprise respective inverters 151 and 251 associated with respective switches 152 and 252 serving to deliver power to one or the other of the actuators concerned.

Similarly, the brake actuators are powered by particular power distribution members, specifically brake controllers 160, 260 each powering two brake actuators per wheel. The brake controllers 160, 260 essentially comprise inverters that are controlled as a function of braking setpoints that are generated by a braking unit (not shown).

The power distribution members 150, 250 and the brake controllers 160, 260 receive electrical power respectively from two power supply buses PW1 and PW2, in this example the three-phase alternating-current (AC) power buses at high voltage.

According to the invention, local controllable DC networks 500 are interposed between the power supply buses of the aircraft and the power distribution members. More precisely, each of the local DC networks 500 is powered by a respective one of the power supply buses PW1 and PW2 of the aircraft, with one of them being associated with the power distribution members 150, 250 and the other with the brake controllers 160, 260.

Figure 2:
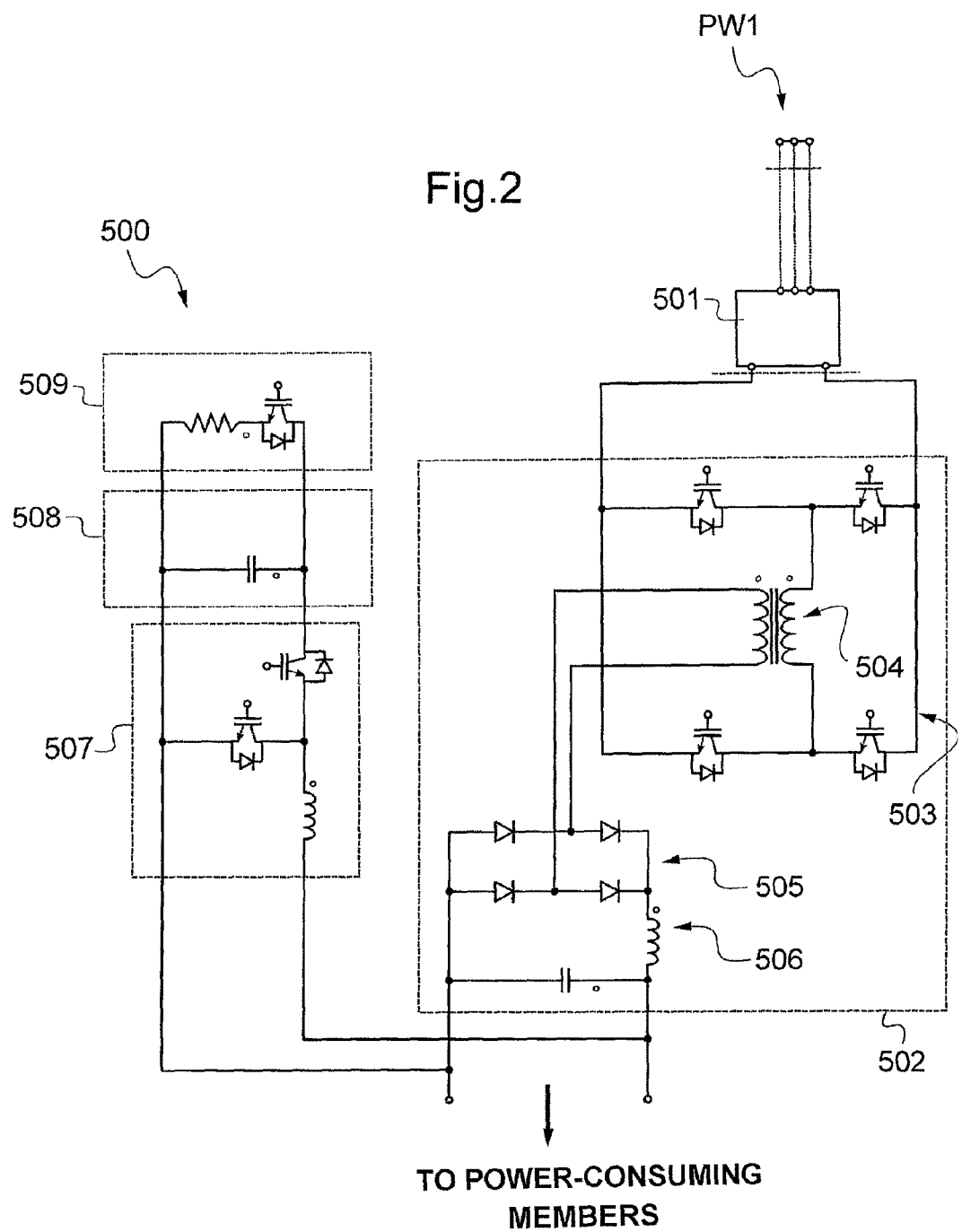
FIG. 2 is a diagrammatic view showing the FIG. 1 DC network in greater detail.

One of the controllable DC networks 500 is shown in detail in FIG. 2.

In this figure, the power supply bus PW1 (here a three-phase AC network) is initially connected to an AC/DC converter 501 to convert the AC voltage into a DC voltage. Thereafter, the DC voltage is supplied to a regulator stage 502, outlined in dashed lines in FIG. 2. The chopper regulator stage 503 is constituted by a controlled transistor bridge having its outlet associated with a transformer 504 serving to provide electrical isolation between the power supply bus PW1 of the aircraft and the remainder of the power distribution architecture. The chopper serves to adjust the DC voltage level that is output by the network 500. The chopped voltage output from the transformer 504 is smoothed in conventional manner by an LC smoothing filter 506. The output from the filter is then connected to power-consuming members, specifically the power distribution members 150, 250 and the brake controllers 160, 260.

The advantages procured by the invention are numerous:
- the presence of controllable DC networks interposed between the power supply buses of the aircraft and the actuators makes it possible to provide cables going down to the actuators that are subjected to the DC voltage only, and that are therefore less likely to radiate, thereby contributing to a reduction in electromechanical emissions and thus enabling the weight of shielding for the cables to be reduced;
- the possibility of adjusting the DC voltage makes it possible to reduce the voltage arbitrarily to a level that does not present any risk for maintenance operators who might need to take action on the actuators. Thus, even though the actuators are capable of being powered at high voltage while they are in operation, the operators run no risk of being exposed to that high voltage while they are performing maintenance operations;
- the presence of a controllable DC network is particularly favorable in the architecture shown herein where the actuators connected thereto operate in sequence, and never simultaneously (except of course the braking actuators which actuate together, but never at the same time as the lifting actuators, the door actuators, or the locking hook actuators). It is thus possible to deliver a voltage to the power distribution member or to the brake controller in question that is well adapted to the power and control needs of the actuator that is to be powered, thereby contributing to reducing losses in the inverters, and to keeping the power demand on the power supply bus of the aircraft down to the power that is strictly necessary.

In particular, it is possible to take account of the impedance of the power supply line of the actuator in question, and to adjust the voltage of the DC network so that the power distribution member or the brake controller receives a voltage that is compensated for the inevitable drop in voltage along the line.

It should be observed that each of the power distribution members 150, 250 powers all of the actuators, such that in the event of one of the power distribution members failing, it continues to be possible to power all of the actuators using the other power distribution member.

In contrast, each of the brake controllers 160, 260 powers only half of the brake actuators on each of the wheels. The loss of one of the controllers therefore leads to a loss of half of the brake actuators. This loss is compensatable, at least in part, by increasing the voltage of the associated DC network so that the actuators that are still being powered temporarily receive power that is higher than the nominal power.

According to a particular aspect of the invention, the DC network interposed in this way includes a branch connection enabling power to be recovered from the actuators without needing to return it to the power supply bus of the aircraft. For this purpose, there can be seen a diode bridge 505 that is disposed ahead of the LC filter 506, thereby preventing the power that comes from the actuators returning to the power supply bus PW1 of the aircraft. This power is thus directed to a DC/DC converter 507, outlined in dashed lines, for calibrating the voltage of the power as recovered in this way. This power at calibrated voltage is stored in a storage member 508, specifically a capacitor. A dissipator member 509 is coupled to the storage member to dissipate excess power coming back from the actuators.

In a variant, instead of dissipating this power, the power can be reinjected into the power supply bus of the aircraft, so as to make it available to other power consumers of the aircraft. It is also possible to reinject this power to the actuators that are connected to the DC network, thereby reducing the power demand on the power supply bus of the aircraft.

The invention is not limited to the above description, but on the contrary covers any variant coming within the ambit defined by the claims.

In particular, although adapted to powering actuators associated with undercarriages, it is possible in the context of the invention to provide a distribution architecture for powering other actuators associated with other movable elements, such as actuators for high-lift devices, bay doors, . . . .

Although a power architecture is described that has two DC networks in which each DC network is associated with an AC power supply bus of the aircraft, it is possible to associate a DC network with a plurality of power supply buses, or with other sources of power, such as batteries, for example.

What is claimed is:

1. A power distribution architecture for an aircraft, having at least one power supply bus, for powering a plurality of aircraft electromechanical actuators, the architecture comprising:
    at least one DC network for supplying voltage that is variable in a controlled manner;
    at least one power distribution member for distributing power to at least one of said plurality of electromechanical actuators connected to the architecture, the architecture receiving power from said at least one power supply bus of the aircraft,
    wherein said at least one DC network is interposed between at least one power supply bus of the aircraft and the at least one power distribution member.

2. A power distribution architecture according to claim 1, wherein the DC network includes branch connection means for taking off power coming from the actuators, and preventing said power from returning to the power supply bus of the aircraft.

3. A power distribution architecture according to claim 2, wherein the branch connection means include means for storing the power as taken off in this way.

4. A power distribution architecture according to claim 1, wherein the DC voltage network includes electrical isolation means isolating the power supply bus of the aircraft from the powered actuators.

* * * * *